(12) United States Patent
Zhao et al.

(10) Patent No.: US 7,723,881 B2
(45) Date of Patent: May 25, 2010

(54) FLAT TYPE MOTORIZED VIBRATORS WITH HIGH VIBRATION OUTPUT

(75) Inventors: Kelong Zhao, Shenzhen (CN); Xuezhong Wu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 302 days.

(21) Appl. No.: 11/645,927

(22) Filed: Dec. 26, 2006

(65) Prior Publication Data

US 2007/0145841 A1      Jun. 28, 2007

(30) Foreign Application Priority Data

Dec. 26, 2005   (CN)   ............... 2005 1 0121330

(51) Int. Cl.
*H02K 33/00* (2006.01)
(52) U.S. Cl. ...................................... 310/81
(58) Field of Classification Search .............. 310/81
See application file for complete search history.

(56) References Cited

U.S. PATENT DOCUMENTS

| | | | |
|---|---|---|---|
| 6,246,143 B1 * | 6/2001 | Yamaguchi | 310/233 |
| 6,291,915 B1 * | 9/2001 | Yamaguchi | 310/71 |
| 6,342,742 B1 * | 1/2002 | Kim | 310/81 |
| 6,765,331 B2 * | 7/2004 | Koyanagi et al. | 310/268 |
| 6,806,603 B1 * | 10/2004 | Choi et al. | 310/81 |
| 6,853,109 B2 * | 2/2005 | Koyanagi et al. | 310/233 |
| 2002/0047370 A1 * | 4/2002 | An et al. | 310/81 |
| 2002/0047469 A1 * | 4/2002 | Park | 310/239 |
| 2004/0227418 A1 * | 11/2004 | Kim | 310/81 |
| 2005/0116560 A1 * | 6/2005 | Yamaguchi et al. | 310/81 |

FOREIGN PATENT DOCUMENTS

| | | |
|---|---|---|
| CN | 1206240 A | 1/1999 |
| KR | 2020030025510 | 11/2003 |

* cited by examiner

*Primary Examiner*—Burton Mullins
(74) *Attorney, Agent, or Firm*—Venture Pacific Law, PC

(57) ABSTRACT

The present invention involves a type of flat, motor-driven vibrator that does not increase the outer physical dimensions of the vibrator while increasing the amount of vibration by changing the mass and balance of the eccentric rotor. The base structure of the eccentric rotor is made of high-density alloy. Two or more coils are installed over the protuberances of the alloy oscillator and a circuit board is installed into the other end of the oscillator. A self-lubricating and wear-resistant, low-density plastic material is injected into the gap between the coils, the oscillator, and the circuit board to mold them together. A cylindrical bore in the middle of the molded plastic is used as a rotor bearing.

17 Claims, 6 Drawing Sheets

FLAT TYPE MOTORIZED VIBRATORS WITH HIGH VIBRATION OUTPUT

CROSS REFERENCE

This application claims priority from a Chinese patent application entitled "Flat type Motorized Vibrators with High Vibration Output" filed on Dec. 26, 2005, having a Chinese Application No. 200510121330.7. This application is incorporated herein by reference in its entirety.

FIELD OF INVENTION

The present invention involves a type of magnetic DC vibrators used in communication tools such as cell phones, beepers, etc. For the occasions when ring tone is undesirable, the vibrator generates vibrations to alert or warn users of incoming signals.

BACKGROUND OF INVENTION

The structure of the commonly used flat type vibrator is illustrated in FIGS. 1a-1b. The eccentric oscillator (1) and coils a and b are glued to the circuit board (2). Then it is injection molded with the oil bearing (4) at the center into a rotor (3). The shaft (5) is held by the lower shell (9). The rotor is then installed on the shaft through the bearing hole. A magnet (8) is adhered onto the lower shell (9) to provide magnetic flux. The electric brushes (10) are welded to the soft circuit board (11). The upper shell (7) covers the rotor and the lower shell. The washers 6a and 6b are installed on the top and the bottom of the rotor bearing, respectively.

FIGS. 2a-2b illustrate a flat type vibrator design disclosed in patent CN1206240A. In order to increase vibration, the coils a, b and c are placed eccentrically. A piece of high density composite engineering plastic (1) is placed at the exterior of the eccentric rotor and extends below the bottom surface of the rotor to increase the eccentric mass. This extended portion extends into the circular space between the magnets (8) and the upper shell (7). The center portion is the resin that has a density less than 1.8 g/m$^3$.

FIGS. 3a-3b illustrate a design that increases vibration disclosed by Korean patent 20-0333424. The eccentric oscillator (1) is placed on the exterior of the rotor rim. It is affixed onto the hard circuit board (2), and is then combined with the center bearing (4) by injection molding.

The problem with the first design is that in order to prevent the oscillator from detaching, the oscillator is injection molded inside the resin, thus limiting the volume of the oscillator and increased the eccentric distance.

In the second design, the increase in the eccentric mass is limited by the composite engineering plastic. The size of the magnets must be reduced because of the extended portion of the rotor, which greatly decreases the magnetic flux of the motor. As a result, the motor performance is greatly reduced.

Although the third design increased the eccentric distance to a certain degree, the increase in the oscillator volume is still limited.

A common problem which exists in all the above designs is that the amount of vibration decreases significantly when the motor size is reduced. Another problem is that the coils and the eccentric oscillator must be adhered with glue before the rotor is molded. If the adhesion is poor, the coils and oscillator may shift in position during molding.

Thus, it is desirable to have an improved vibrator design that increases the amount of vibration within a given size.

SUMMARY OF INVENTION

An object of this invention is to increase or maintain the amount of vibration when the size of the flat type vibrator is decreased or maintained.

Another object of the present invention is to simplify the manufacturing process of the vibrator.

The technical method of the present invention is a flat type vibrator with high vibration output. In the presently preferred embodiment, the vibrator comprises: an oscillator, a hard circuit board, a rotor, a shaft in the middle of the rotor to support rotor rotation, a lower shell to hold the shaft, one or more magnets fixed on the lower shell to provide magnetic force, a soft circuit board affixed onto the lower shell to receive input current, an electric brushes connecting to the soft circuit board and the rotor, and the coils. The oscillator is injection molded into the said rotor. Its characteristics are, in one aspect, the coils and the hard circuit board are installed on the oscillator where the rim of oscillator extends beyond the position of the coils and hard circuit board.

An advantage of this invention is that it increases or maintains the amount of vibration when the size of the flat type vibrator is decreased or maintained.

Another advantage of the present invention is that it simplifies the manufacturing process of the vibrator.

DESCRIPTION OF THE DRAWINGS

The following are further descriptions of the embodiments of the invention with references to figures and examples of their applications.

DETAILED DESCRIPTION OF EMBODIMENTS

Figure 1A:
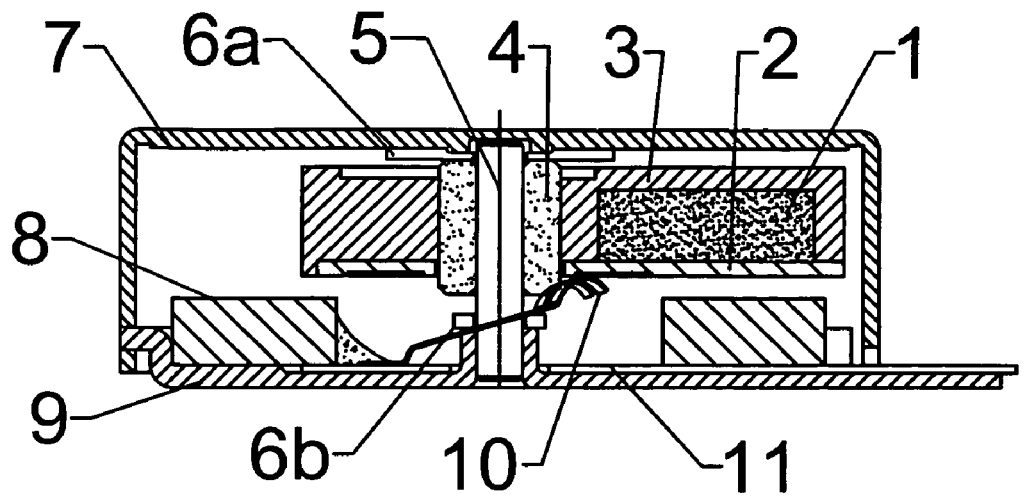
FIGS. 1a and 1b illustrate a structure of a commonly used flat type vibrator.
Figure 1B:
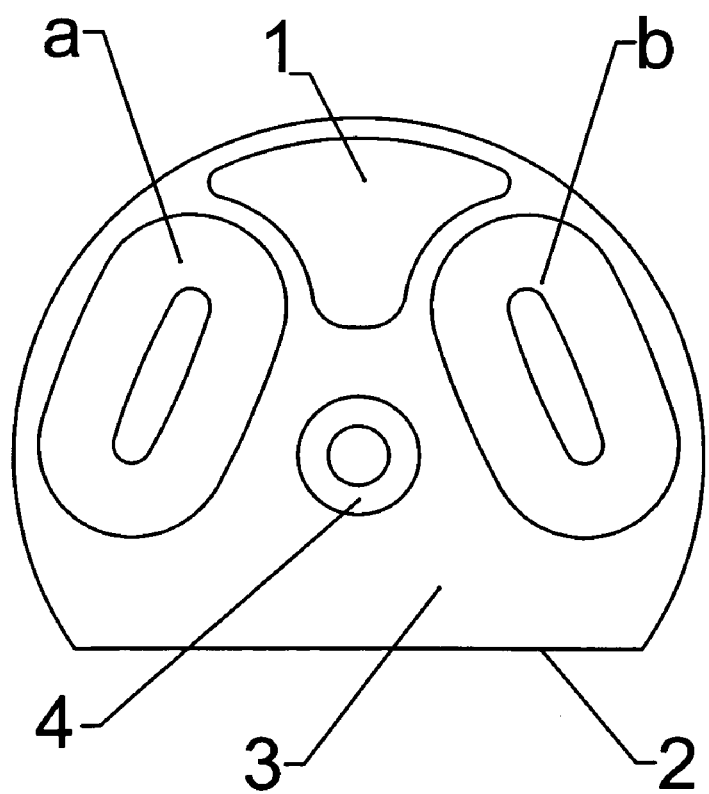
Figure 2A:
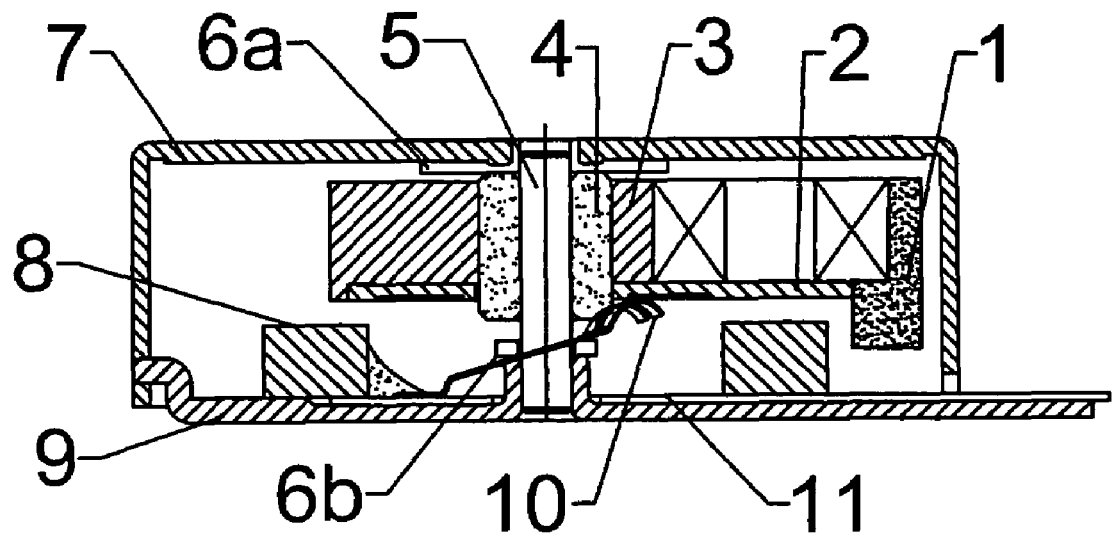
FIGS. 2a and 2b illustrate a structure of an improved flat type vibrator of existing technology.
Figure 2B:
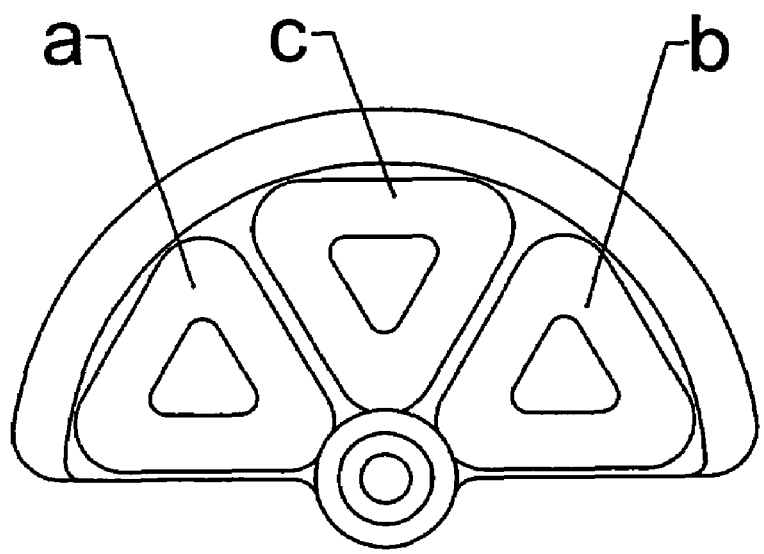
Figure 3A:
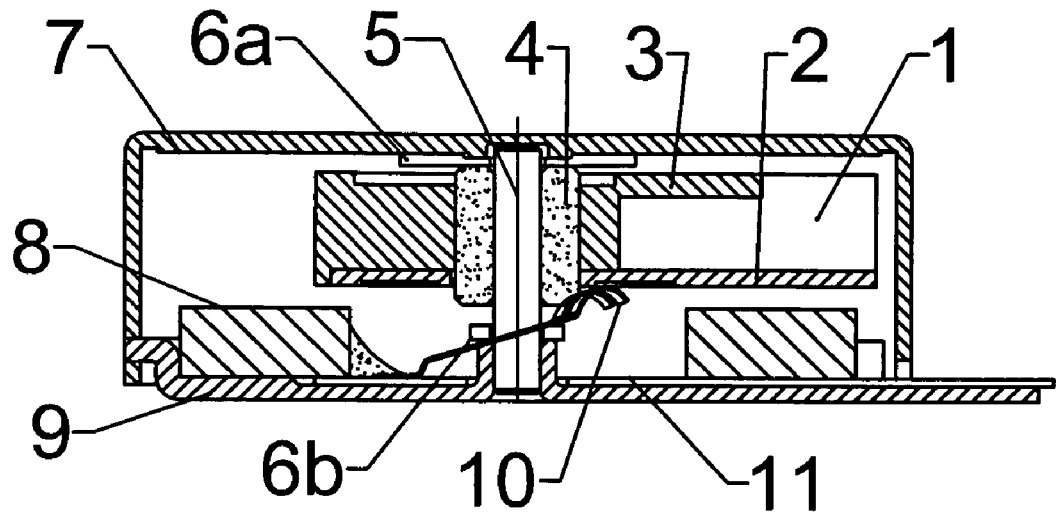
FIGS. 3a and 3b illustrate a structure of another improved flat type vibrator of existing technology.
Figure 3B:
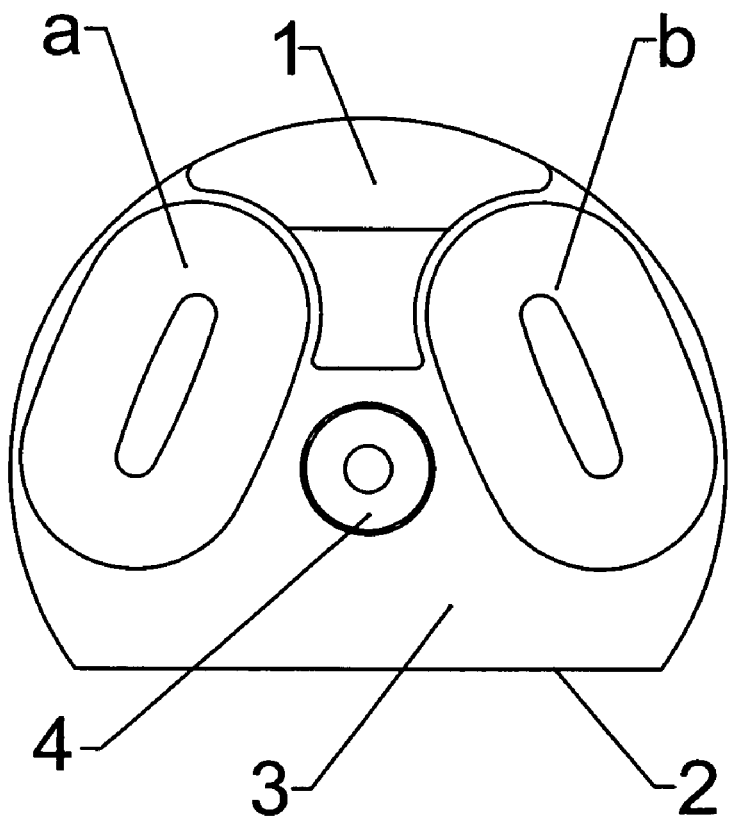

The technical method of the present invention is a flat type vibrator with high vibration output. In the presently preferred embodiment, the vibrator comprises: an oscillator, a hard circuit board, a rotor, a shaft in the middle of the rotor to support rotor rotation, a lower shell to hold the shaft, one or more magnets fixed on the lower shell to provide magnetic force, a soft circuit board affixed onto the lower shell to receive input current, an electric brushes connecting to the soft circuit board and the rotor, and the coils. The oscillator is injection molded into the said rotor. Its characteristics are, in one aspect, the coils and the hard circuit board are installed on the oscillator where the rim of oscillator extends beyond the position of the coils and hard circuit board.

Preferably, in the preferred embodiments of the present invention includes the following characteristics: on one side of said oscillator there are protuberances for coil installation; the other side of said oscillator there is a groove (e.g., a groove 15, illustrated in FIG. 6b) for the installation of the hard circuit board; and the radius of hard circuit board is smaller than the radius of the oscillator and the hard circuit board can be directly inserted into the inside of the oscillator groove.

The oscillator can be made with alloys having a density greater than 15 kg/m³, including tungsten alloy. The oscillator surface can be plated with nickel to increase magneto conductivity between the center of the coil and from the coils to magnets. The oscillator can have a spout shape thick in the middle and at the top extending along the edge of the rotor.

The hard circuit board preferably is double sided. The side contacting the electric brushes is made as a commutator. The radius of the hard circuit board is smaller than the oscillator radius.

The rotor parts are molded together with composite resins having a density preferably less than 2 kg/m³ The resin is self-lubricating, wear-resistant, and has a bore in the middle.

The aforementioned design calls for first installing the coils and the hard circuit board on to the oscillator to form a unique oscillator assembly, then molding the said unique oscillator assembly into the rotor. Since the coils and the hard circuit board are installed onto the oscillator, they are no longer a physical restriction in extending the oscillator. The rim of the oscillator, therefore, extends beyond the coils and the hard circuit board. As a result, though the overall size of the vibrator can be reduced, the oscillator volume is increased, thus increasing the amount of vibration. Additionally, the performance of the magnets and coils is not affected.

The following paragraph describes the preferred embodiment of this invention and as illustrated in FIG. 4a-4b, FIG. 5a-5b, and FIG. 6a-6b. The same call-out numbers are used to represent the same or similar parts throughout the figures.

A flat type vibrator of this invention includes a shell having a power input and a transmission device, the rotor that rotates and generates the eccentric vibration, and a stator formed with the upper shell and vanes. The stator includes the upper shell and vanes affixed to the round protuberance at the center of the upper shell which dampen vibration and friction. The motor cover comprises the following: the lower shell, the soft circuit board adhered to the lower shell to connect to power input, the electric brushes welded to the soft circuit board, the shaft pressed into the center of the cover, and the washer on the shaft and below the rotor. The rotor comprises the oscillator with a material density higher than 15 kg/m³, coils pressed over the elliptical protuberances, and injected molded plastic resin having a density less than 2 kg/m³.

Figure 4A:
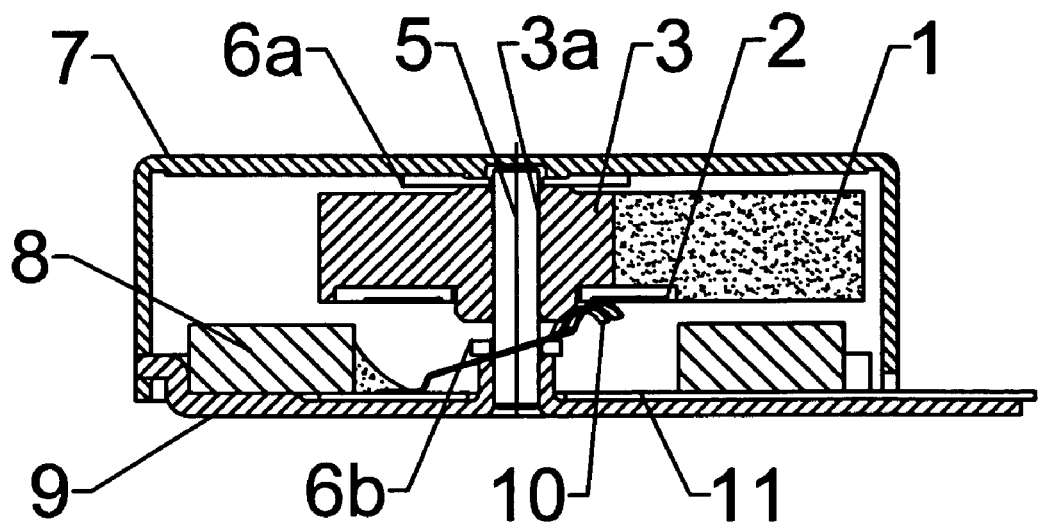
FIGS. 4a and 4b illustrate a structure of the present invention.
Figure 4B:
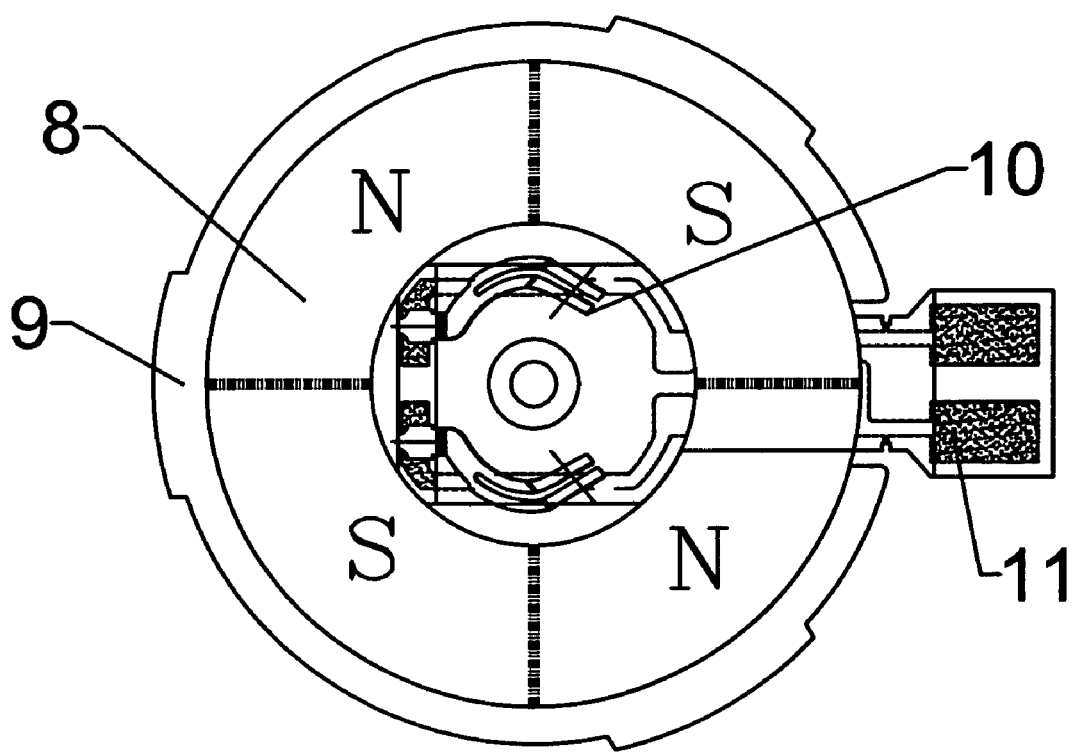

FIG. 4a-4b are cross-sectional views of an embodiment of this invention.

This is an embodiment of a flat type vibrator with higher vibration output designed in accordance with this invention. The motor shell, which has power input and the magnetic flux, comprises a lower shell (9), a soft circuit board (11) adhered to the lower shell with double-sided glue, and a pair of electric brushes (10) made with high-elastic material welded onto the soft circuit board. The current flows from the soft circuit board through the electric brushes to the rotor. The high-magnetic planar quad-pole magnets (8) are adhered onto the lower shell.

Figure 5A:
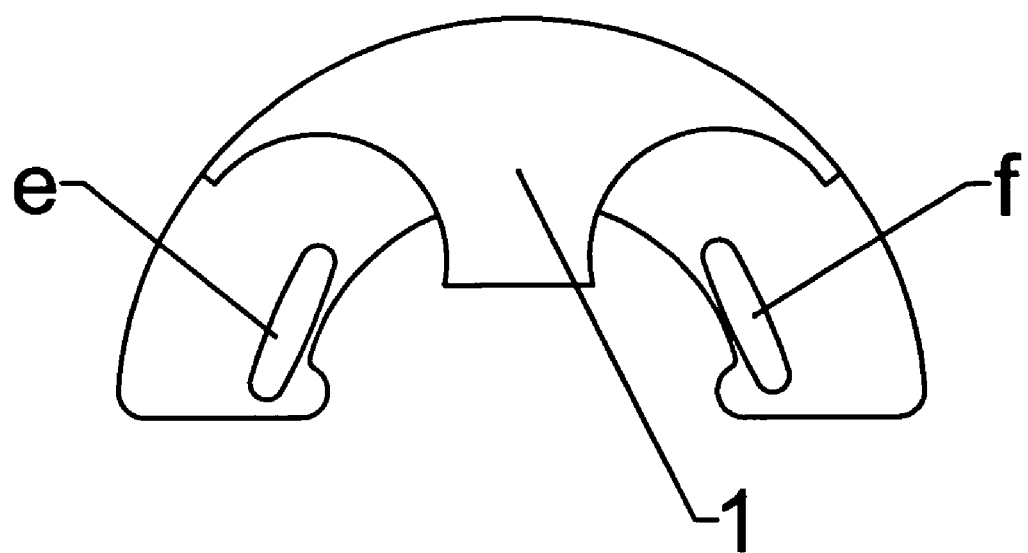
FIGS. 5a and 5b illustrate an oscillator structure of the present invention.
Figure 5B:
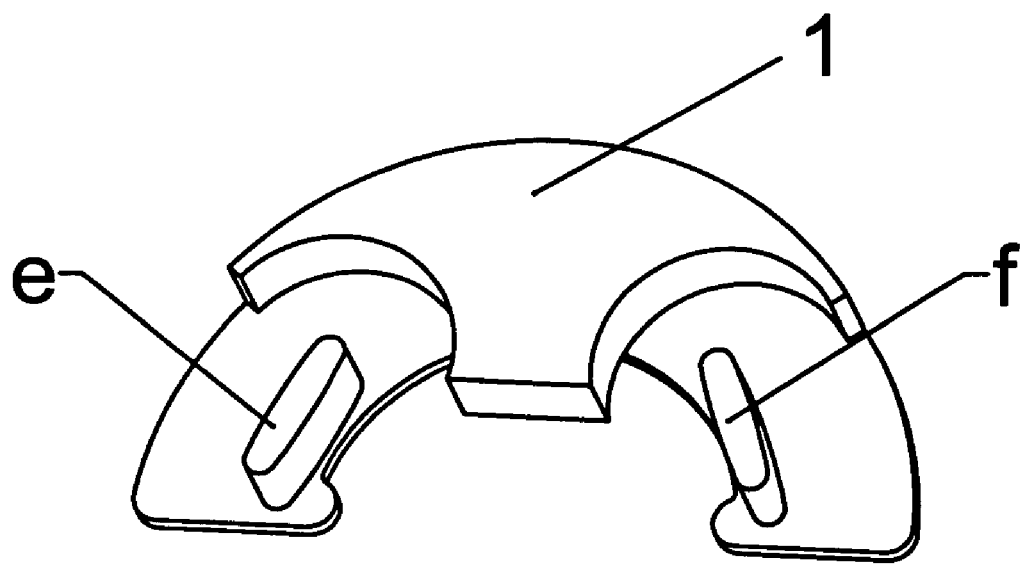
Figure 6A:
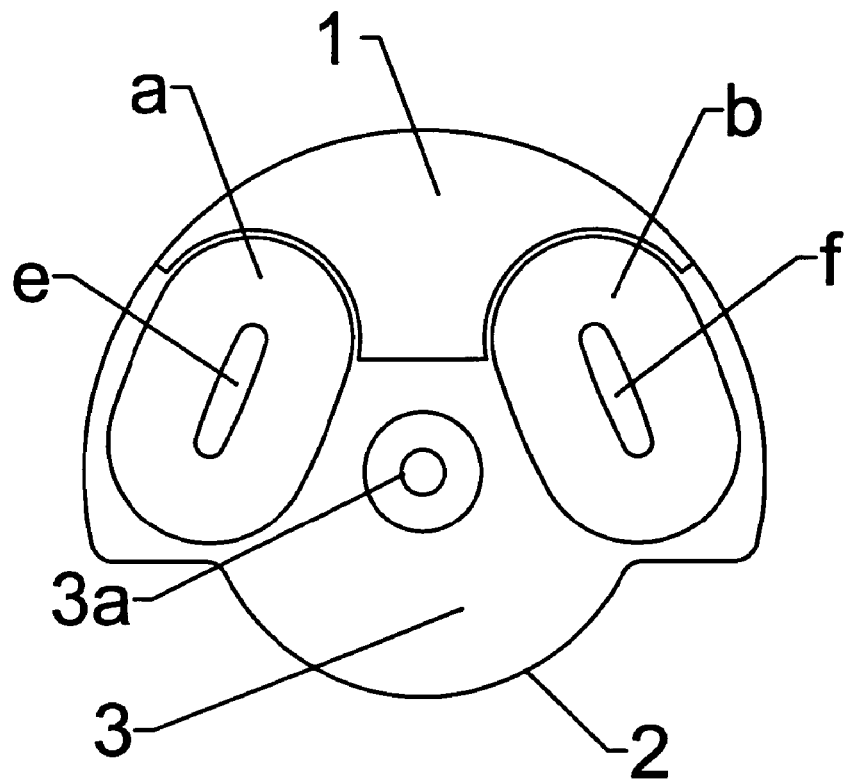
FIGS. 6a and 6b illustrate a structure of the rotor of the present invention.
Figure 6B:
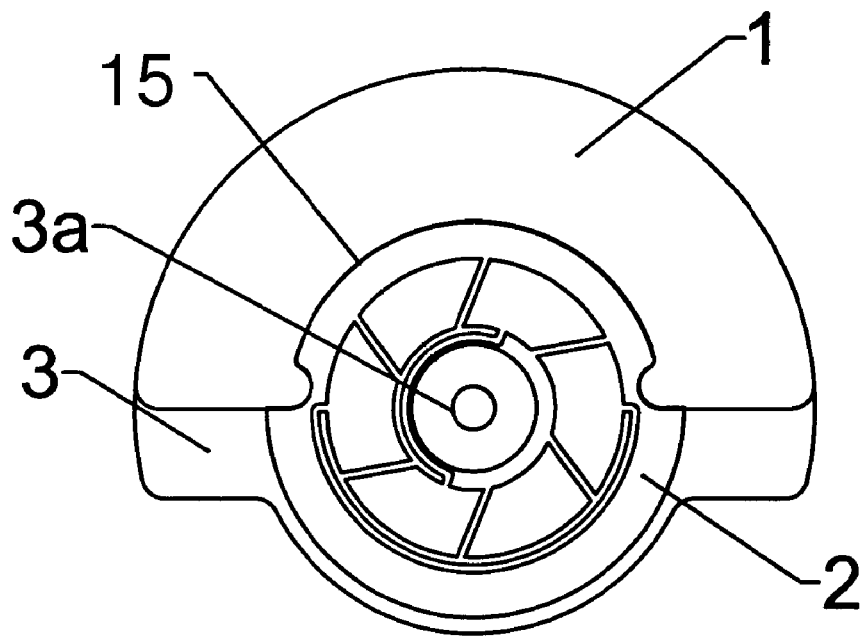

The rotor includes an oscillator (1) as illustrated in FIGS. 5a-5b. The oscillator has two elliptical protuberances e and f which match the inner opening of the coils. As illustrated in FIGS. 6a-6b, coils a and b are installed at the protuberances e and f. The hard circuit board (2) is inserted into the corresponding groove 15 on the other end of the oscillator. The unevenly distributed commutator segments on the front surface of the hard circuit board connect to the corresponding welding spots on the back of the board, with the coil taps connecting to the spots. All the above parts are molded with self-lubricating and wear-resistant composite resins to form the rotor, while the cylindrical bore (3a) in the middle of the molded resin is used as a bearing. The advantage of adding protuberances e and f is to increase the oscillator mass and to prevent a potential problem in coil shifting, a problem that prevented the increase of oscillator mass in other technologies. The resins are injected only after the coils and the hard circuit board are installed on the oscillator so it would prevent poor molding.

The motor shells illustrated in FIGS. 4a-4b, include a double-sided glue-smeared washer 6a adhered onto the shell (7). The shell and the lower shell are assembled, and then are either sealed or laser welded together.

During operation, electrical current flows from the soft circuit board (11) through the brushes (10), into the commutator segments on the hard circuit board (2), and into coil a or coil b. The energized coils in the magnetic field of magnets (8) generate torque around the shaft (5). The commutator changes the current periodicity of coil a or coil b, which generates continuous torque for the eccentric rotor to rotate, thus generating vibration.

As described above, the flat type vibration motors disclosed by this invention greatly increase oscillator mass and eccentric distance, reduce the difficulty in assembly, and greatly increase motor vibration to improve production efficiency.

The advantages of this invention are:

The oscillator is made with high density tungsten alloy which greatly increases the mass per unit volume.

The surface of the oscillator is plated with nickel, increasing the magneto conductivity between the coils and the magnets, especially the magneto conductivity at the coil center, which increases magnetic flux through the coils.

The oscillator is used as the base structure of rotor assembly. It allows the outward extension of the oscillator without being blocked by the coils and the hard circuit board, thus greatly increasing the volume of the oscillator. The coils and the hard circuit board need only be installed to the corresponding locations on the oscillator and are then molded into the rotor.

The rotor is molded with self-lubricating and wear-resistant composite resins. The cylindrical bore at the middle of the molded resin is used as the bearing to eliminate oil-bearing to prevent the commutator surface from oil contamination caused by bearing grease, and as a result, lengthens motor lifespan.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

The invention claimed is:

1. A type of flat vibrator, comprising:
    an oscillator having a spout shape without a center portion, a first side and a second side, wherein the first side of said oscillator comprises one or more elliptical protuberances and a weight;
    a hard circuit board, wherein the second side of said oscillator comprises a groove, and wherein the hard circuit board is installed into the grove of the oscillator and forming the center portion of a rotor;
    the rotor;
    a shaft in the middle of the rotor to support rotation of the rotor;
    a lower shell holding the shaft;

magnets disposed on the lower shell providing magnetic force;

a soft circuit board for receiving power input and disposed on the lower shell; and electric brushes connecting to the soft circuit board, the rotor, and coils;

wherein said coils are installed on the oscillator by disposing the coils on the one or more elliptical protuberances; wherein the hard circuit board is installed on the oscillator and forms the center portion of the rotor, and the oscillator is injection molded onto the rotor; wherein the oscillator has a rim extending beyond the position of the coils and the hard circuit board.

2. The flat vibrator of claim 1, wherein the radius of the hard circuit board is smaller than the radius of the oscillator and the hard circuit board is directly installed inside the oscillator groove.

3. The flat vibrator of claim 2, wherein the hard circuit board of the rotor is a double-side board, and where the side contacting the electric brushes forms a commutator.

4. The flat vibrator of claim 1, wherein the oscillator is made with alloy materials having a density higher than 15 kg/m$^3$.

5. The flat vibrator of claim 1, wherein the oscillator is plated with magnetic nickel in order to increase magneto conductivity between the coils and magnets.

6. The flat vibrator of claim 1, wherein the rotor parts are molded together with injected composite resin having a density less than 2 kg/m$^3$, and the resin is self-lubricating and wear-resistant.

7. A type of flat vibrator, comprising:

a rotor having an oscillator disposed thereon, wherein said oscillator has a rim, a hard circuit board, a weight, a spout shape without a center portion, and a groove, wherein the hard circuit board is installed into the grove of the oscillator and forms the center portion of the rotor;

a shaft in the middle of the rotor to support rotation of the rotor;

a lower shell holding the shaft;

one or more magnets disposed on the lower shell;

a soft circuit board for receiving power input and disposed on the lower shell; and electric brushes connecting to the soft circuit board, the rotor, and coils;

wherein said oscillator has a first side and a second side, wherein the first side of said oscillator comprises one or more elliptical protuberances used for the installation of the coils and the weight, wherein the coils are disposed on the one or more elliptical protuberances, wherein the rim extends beyond the position of the coils, wherein the groove and the hard circuit board are positioned on the second side of said oscillator, and wherein the hard circuit board, the oscillator and the coil are injection molded onto the rotor.

8. The flat vibrator of claim 7, wherein the radius of the hard circuit board is smaller than the radius of the oscillator and the hard circuit board is installed into the groove.

9. The flat vibrator of claim 7, wherein the oscillator is made with alloy materials having a density higher than 15 kg/m$^3$.

10. The flat vibrator of claim 7, wherein the oscillator is plated with magnetic nickel in order to increase magneto conductivity between the coils and magnets.

11. The flat vibrator of claim 7, wherein the hard circuit board is a double-side board, where the side contacting the electric brushes forms a commutator.

12. The flat vibrator of claim 7, wherein the rotor parts are molded together with injected composite resin having a density less than 2 kg/m$^3$, and the resin is self-lubricating and wear-resistant.

13. A type of flat vibrator, comprising:

a rotor having an oscillator disposed thereon;

the oscillator having a spout shape extending along the edge of the rotor and without a center portion;

a hard circuit board, where the hard circuit board having a side with a commutator for contacting with electric brushes;

one or more coils;

a shaft in the middle of the rotor to support rotation of the rotor;

a lower shell holding the shaft;

one or more magnets disposed on the lower shell;

a soft circuit board for receiving power input and disposed on the lower shell; and the electric brushes connecting to the soft circuit board;

wherein said oscillator has a first side and a second side, wherein the first side of said oscillator comprises one or more elliptical protuberances used for the installation of the coils and a weight, wherein the second side of said oscillator comprises a groove and the hard circuit board is inserted in the groove forming the center portion of the rotor, and wherein said protuberances are made with alloy materials having a density higher than 15 kg/m$^3$; and wherein the oscillator and the coil are injection molded onto the rotor.

14. The flat vibrator of claim 13, wherein the radius of the hard circuit board is smaller than the radius of the oscillator.

15. The flat vibrator of claim 13, wherein the rim and the protuberances are made with alloy materials having a density higher than 15 kg/m$^3$.

16. The flat vibrator of claim 13, wherein the oscillator is plated with magnetic nickel in order to increase magneto conductivity between the coils and magnets.

17. The flat vibrator of claim 13, wherein the rotor parts are molded together with injected composite resin having a density less than 2 kg/m$^3$, and the resin is self-lubricating and wear-resistant.

* * * * *